Figure 2:
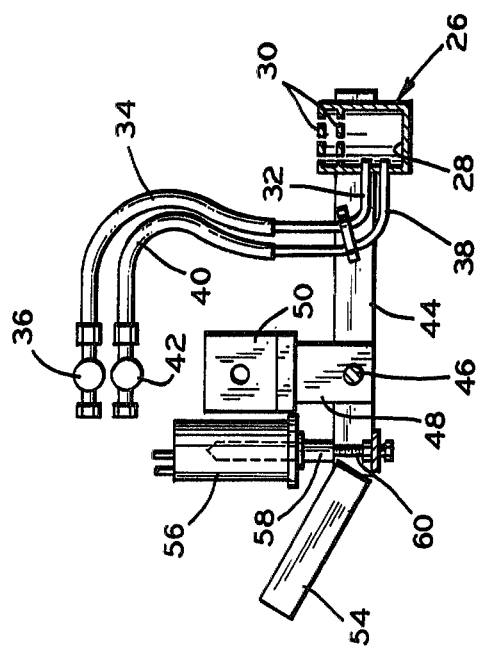

United States Patent [19]

Skipper

[11] 4,306,508
[45] Dec. 22, 1981

[54] PLANTER WITH A MELTER FOR FORMING HOLES IN PLASTIC SHEETING ON THE GROUND

[76] Inventor: Kevin G. Skipper, Merlin, Ontario, Canada

[21] Appl. No.: 103,381

[22] Filed: Dec. 13, 1979

Related U.S. Application Data

[63] Continuation-in-part of Ser. No. 967,590, Dec. 8, 0978, Pat. No. 4,265,185.

[51] Int. Cl.³ .......................... A01C 5/04; A01C 11/02
[52] U.S. Cl. ............................................ 111/1; 47/9; 111/2; 126/271.1; 126/401
[58] Field of Search ............. 47/9; 264/154; 126/401, 126/271.2 R, 271.1; 111/1, 2, 3

[56] References Cited

U.S. PATENT DOCUMENTS

| | | | |
|---|---|---|---|
| 711,138 | 10/1902 | Tynan | 126/271.2 R |
| 3,175,425 | 3/1965 | Kappelman | 47/9 X |
| 3,287,850 | 11/1966 | Da Valle | 47/9 |
| 3,460,493 | 8/1969 | Stephenson, et al. | 47/9 X |
| 3,559,599 | 2/1971 | Hoadley | 47/9 X |
| 4,117,787 | 10/1978 | Pavan | 47/9 X |

FOREIGN PATENT DOCUMENTS

| | | | |
|---|---|---|---|
| 2411557 | 8/1979 | France | 47/9 |
| 636765 | 5/1950 | United Kingdom | 126/401 |

*Primary Examiner*—Steven A. Bratlie
*Attorney, Agent, or Firm*—Allen D. Gutchess, Jr.

[57] ABSTRACT

A planter is provided which automatically deposits equally-spaced, sprout-bearing plugs of specially prepared nutriet soil into the ground. The planter can also be equipped with a supply tank and pipe for adding a measured quantity of gel containing water and seeds with the sprout-bearing plugs. The planter is also equipped with a melting member or piston which is heated. The piston is mounted on a counterweighted arm and moves up and down by means of a solenoid. The piston, which is suitably internally heated by an air-fuel mixture, contacts and melts an oblong hole in plastic sheeting when such sheetings was laid down on a field when it was prepared for planting. The plugs are then planted through these holes.

7 Claims, 2 Drawing Figures

U.S. Patent Dec. 22, 1981 4,306,508

PLANTER WITH A MELTER FOR FORMING HOLES IN PLASTIC SHEETING ON THE GROUND

This patent application is a continuation-in-part of my co-pending patent application Ser. No. 967,590, filed on Dec. 8, 1978, now U.S. Pat. No. 4,265,185.

This invention relates to apparatus for planting seeds or sprouts and for melting holes in sheeting on a field to enable the seeds or sprouts to be planted.

In some areas of North America, crops are planted through plastic sheeting which is laid down when the field is prepared for planting. Heretofore, holes were either punched in the plastic sheeting, using a suitable pointed shaft or sharpened tube, or burned in the sheeting by an open flame. Neither of these techniques produced uniformly consistent holes with all of the plastic removed from the perimeter of the holes.

In accordance with the invention, a heated melting member or piston is used with the planter to engage and melt the plastic sheeting and completely remove the plastic from the area which the piston contacts. Preferably, this melting piston is internally heated, as by a suitable air-fuel mixture. Baffles are located above the combustion chamber of the piston to obtain the maximum benefit of the heat and to prevent wind from blowing out the flame. The piston is carried by the planter for up and down movement into and out of contact with the plastic sheeting to form the holes therein at the desired positions and at proper intervals. The piston can be attached to a pivotable arm carried by the planter with the arm preferably being counterweighted to minimize the effort needed to raise and lower the heated piston. The arm can be pivoted by a suitable solenoid connected to an end portion of the arm and operated at suitable intervals.

It is, therefore, a principal object of the invention to provide apparatus for planting seeds or sprout plugs and having means for forming oblong holes in plastic sheeting laid over a field.

Another object of the invention is to provide a planter with means for forming more uniform and cleaner holes in plastic sheeting on a field.

Yet another object of the invention is to provide a planter with a heated melting member or piston for forming holes in plastic sheeting on a field to be planted.

Figure 1:
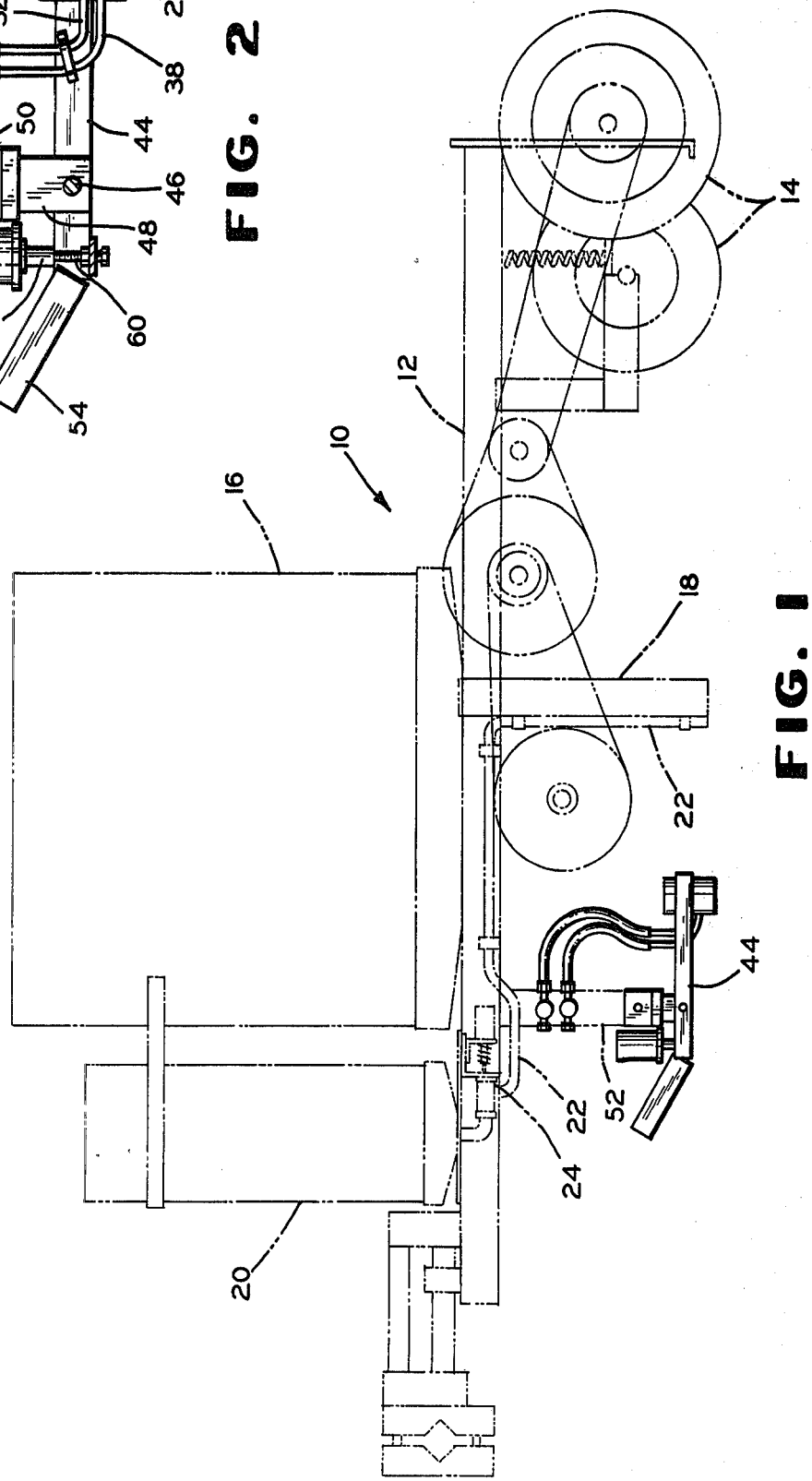

Many other objects and advantages of the invention will be apparent from the following detailed description of a preferred embodiment thereof, reference being made to the accompanying drawings, in which:

FIG. 1 is a schematic side view in elevation of a planter embodying the invention with the previously known parts in broken lines and the new components in solid lines; and FIG. 2 is a schematic, somewhat enlarged, side view in elevation of the new components of FIG. 1.

Referring to FIG. 1, a planter according to the invention is indicated at 10 and includes an elongate frame 12 which is supported at the rear end by two wheels 14. A large container 16 is supported on an intermediate portion of the frame with the seed or sprout-bearing plugs of specially prepared nutrient soil being located in the container 16. The plugs are discharged through a vertical chute 18 from the container 16 to the ground. The discharge of the plugs is controlled by a solenoid-operated tripping door (not shown) located in the chute 18.

A gel storage tank 20 is located next to the container 16 and has a discharge pipe 22 in which is an intermittently-operated discharge control mechanism 24. The discharge end of the pipe 22 is in side-by-side relationship with the discharge end of the chute 18. The discharge of the gel is synchronized with the discharge of the plug through suitable make-and-break contact points of the planter. More details on the operation of the planter as described to this point can be found in my aforesaid U.S. patent application Ser. No. 967,590, filed on Dec. 8, 1978.

In some areas of North America, for example, plastic sheeting is laid down on a field when it is prepared for planting. Consequently, it was necessary to punch a hole in the plastic by using a pointed shaft or sharpened tube or by burning a hole in the plastic by means of an open flame. Unfortunately, the holes made with these techniques failed to remove all the plastic from the perimeter of the holes and/or failed to obtain consistently uniform holes for planting. These deficiencies, however, have been overcome by the new planter 10 which carries its own improved hole-forming means.

The heart of the hole-forming means is in a melting member or metal piston 26 which is heated and melts the hole in the plastic sheeting when lowered into contact therewith. The melting member 26 preferably is internally heated, and for this purpose has an internal combustion chamber 28 formed therein with a plurality of baffles 30 at an upper portion thereof. The baffles protect the burning air-fuel mixture in the member from being blown out and also retard exiting of the burning mixture to provide maximum heating of the member 26. The air can be supplied to the chamber 28 by a pipe 32 and a flexible hose 34 connected to a valve 36 which, in turn, is connected to a suitable source of air under pressure or to a blower. Similarly, fuel in the form of gas, for example, is supplied through a pipe 38, a flexible hose 40, and a valve 42 which, in turn, is connected to a suitable supply of fuel under pressure. The pipes 32 and 38 can be joined at their entrance to the chamber 28 or they can supply the air-fuel mixture separately, allowing it to mix and to burn in the chamber 28. The pipes can also be oriented at tangential positions to the chamber to supply the air and fuel in a swirling pattern.

The melting member 26 is suitably mounted between two lever arms 44. These are pivotally connected through a pivot pin 46 to a pivot plate 48 which, in turn, is affixed to a connecting bracket 50. The bracket 50 is affixed to a depending bar 52 (FIG. 1) which extends downwardly from the frame 12 and which also supports the valves 36 and 42. A counterweight 54 is located on the other ends of the lever arms 44 to offset the weight of the melting member 26.

The melting member can be raised and lowered into and out of contact with the plastic sheeting by any suitable means. As shown, the means includes an electrically-operated solenoid 56 having an armature rod 58 connected to the lever arms 44 through a suitable adjustment 60. When the solenoid is activated, the armature rod 58 is pulled upwardly to force the melting member 26 downwardly against the plastic sheeting to melt a hole in it. When the solenoid is deactivated, the counterweight 54 causes those ends of the lever arms to lower and thus, raise the melting member out of contact with the plastic sheeting. Pneumatic or hydraulic cylinders could be used in place of the solenoid, by way of example.

The hole formed in the plastic sheeting actually is oblong since the planter 10 is moving forwardly as the melting member moves into contact with the plastic sheeting. The length of the hole depends upon the extent of the time the solenoid 56 is activated; however, this is usually very short. The operation of the melting member 26 is synchronized with the plug and gel components, as by the make-and-break contact points of the planter, with the frequency of the make-and-break contacts being dependent upon the speed of the planter, as discussed more fully in my aforesaid co-pending application.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A planter for planting sprout-bearing plugs of nutrient soil in the ground, said planter comprising, in combination, a framework, wheels carried by said framework for supporting same, a container carried by said framework for storing mixture from which the plugs are formed, said container having a discharge chute extending downwardly toward the ground through which the plugs are discharged, a melting member for melting holes in plastic sheeting laying on the ground through which the plugs are planted, means for internally heating said melting member by a mixture of air and fuel, means connecting said melting member to said framework to enable said melting member to be moved toward and away from the ground to contact the plastic sheeting and melt the holes therein, and moving means for moving said connecting means in synchronization with the discharge of the plugs from the discharge chute.

2. A planter according to claim 1 wherein said melting member has a bottom wall and a side wall forming an internal combustion chamber and has baffles at an upper portion thereof, flexible hose means for supplying air to said internal combustion chamber, and flexible hose means for supplying fuel to said internal combustion chamber.

3. A planter according to claim 1 characterized by said connecting means pivotally connecting said melting member to said framework.

4. A planter according to claim 3 characterized by said moving means comprising an electrically-operated solenoid.

5. In a planter which is equipped with means for discharging plugs of sprouts or seeds at predetermined intervals toward the ground through holes in plastic sheeting laying on the ground, a device carried by said planter for forming the holes in the plastic sheeting laying on the ground, said device comprising a melting member having a bottom wall and a side wall forming an internal combustion chamber and having baffles at an upper portion thereof to protect a burning air-fuel mixture in the melting member from being blown out and also to retard exiting of the burning mixture to provide maximum heating of the melting member, flexible hose means for supplying air to said internal combustion chamber, additional flexible hose means for supplying fuel to said internal combustion chamber, and means carried by said planter for moving said melting member toward and away from the plastic sheeting laying on the ground, in which sheeting the holes are to be formed.

6. A device according to claim 5 characterized by the bottom wall of said melting member being circular.

7. A device according to claim 5 characterized by said means carried by said planter for moving said melting member toward and away from said plastic sheeting comprising a pivotal arm pivotally carried by said planter, and means for moving said pivotal arm in synchronization with the discharge of the plugs from the planter.

* * * * *